United States Patent [19]
Pereira

[11] Patent Number: 5,994,792
[45] Date of Patent: Nov. 30, 1999

[54] ELECTRICAL POWER MANAGEMENT SYSTEM

[75] Inventor: Carlos M. Pereira, Tannersville, Pa.

[73] Assignee: The United States of America as represented by the Secretary of the Army, Washington, D.C.

[21] Appl. No.: 09/208,033

[22] Filed: Nov. 25, 1998

[51] Int. Cl.[6] .................................................. H02J 1/00
[52] U.S. Cl. ............................................................. 307/38
[58] Field of Search ........................ 363/39, 40; 323/273, 323/275, 276; 307/30, 31, 38, 39, 42

[56] References Cited

U.S. PATENT DOCUMENTS

| | | | |
|---|---|---|---|
| 4,042,830 | 8/1977 | Kellenbenz et al. | 307/40 |
| 4,324,987 | 4/1982 | Sullivan, II er al. | 307/35 |
| 5,107,184 | 4/1992 | Hu et al. | 307/40 |
| 5,615,105 | 3/1997 | Tofigh et al. | 307/31 |

*Primary Examiner*—Matthew Nguyen
*Attorney, Agent, or Firm*—John F. Moran; Michael C. Sachs

[57] ABSTRACT

The disclosure is of a power supply system in which the primary source of power is a battery which is connected to a plurality of channels each of which feeds power to a bank of devices having similar electrical noise characteristics.

4 Claims, 3 Drawing Sheets

ELECTRICAL POWER MANAGEMENT SYSTEM

The invention described herein may be manufactured and used by or for the Government of the United States for governmental purposes.

BACKGROUND OF THE INVENTION

This invention relates to electromechanical systems which include motors, computers, sensors, communication systems and various other electronic circuits. Most of these devices are sensitive to noise and their operation may be adversely affected by noise. In general, components in electromechanical systems, particularly motors, generate noise which interferes with the operation of other sensitive electronic apparatus which may be in the system. The noise is fed to all circuits which receive their power from a common power supply and power bus and the noise is shared with all circuitry which is contaminated thereby.

In general, it is desirable that electromechanical systems operate with maximum efficiency, use minimum power while generating minimum heat and provide maximum regulation and noise filtering. No power supply system known, either commercial or military, solves the problem of noise satisfactorily in the most sensitive applications.

SUMMARY OF THE INVENTION

The present invention provides a power supply system for electromechanical systems in which devices and elements having similar electrical noise characteristics are grouped in banks and each bank is connected in its own channel to a power supply. The system overcomes the power supply performance deficiencies found in past power supplies and provides optimum filtering by combining passive and active filter technology.

The system also includes a self-diagnostic module for each channel. This module detects malfunctions in each power bank or in the load that it is supplying and turns off the affected power bank through the operation of system computers with a diagnostic signal which is interpreted by the computers as a power bank emergency shut off instruction. The computers send this instruction to an on/off control input of the affected linear power bank and the power output shuts off.

DESCRIPTION OF THE INVENTION

An electromechanical system 10 using the principles of the present invention satisfies the following operating requirements and has the indicated parameters.

1. The DC power efficiency is maximized while the system provides a minimum of at least 80 decibels of noise rejection in the entire process of converting, regulating and filtering power.
2. There are internal short circuit and thermal protection.
3. There is a diagnostic system which simplifies maintenance and repair and provides a fault detection function.
4. The system can interface with different operating voltage levels.
5. The system provides a high degree of isolation between the control inputs and the supply of power to the various loads.

To maximize the power efficiency of the system of the invention, a combination of switching power supply technology and linear power supply technology is utilized and incorporated. The main engine of the system is the linear power banks, each of which comprises devices having similar electrical noise characteristics.

The energy dissipated as heat in the system loads can be removed primarily by convection cooling. The system of the invention has been operated at 85 degrees Fahrenheit with all linear power supply banks operating at their specified maximum current.

Figure 1:
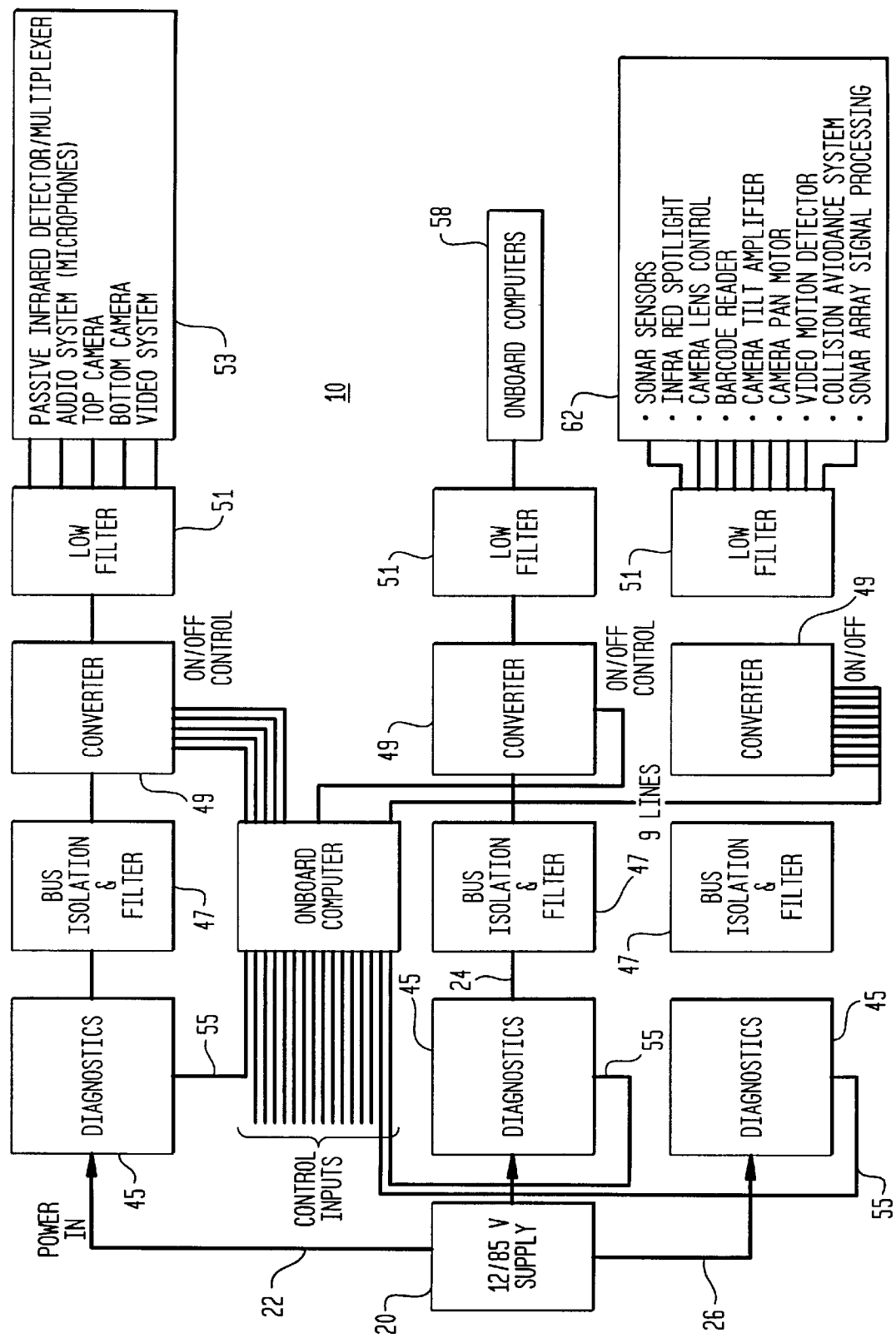
FIG. 1 is a block diagram of the system of the invention.

Referring to FIG. 1 for a detailed description of the invention, the system of the invention 10 includes a main power supply 20 which comprises a battery of any suitable voltage, for example 12 to 35 volts. The battery power supply 20 is coupled through a plurality of channels and circuit elements therein to groups of power-using devices. One operating system includes three channels and three buses 22,24,26 leading thereto from the power supply. However other numbers of channels and buses could be used. The buses distribute power from the 24 volt battery supply at 6 amperes (in one system) for each power bus.

Bus 22 runs from the battery power supply 20 to a first channel which includes a diagnostic circuit module 45, to be described below and then to module 47 which provides bus isolation and high freqwuency filtering made of selected inductors and capatiros. The channel next includes a linear controllable power converter, to be described below, and low frequency filtering means in module 51. Module 51 is coupled to a bank 53 of sytem devices such as a passive infrared detector/multiplexer, an audio system, perhaps cameras and perhaps a video system if the system of the invention is used in, for example, a mobile platform. These devices in bank 53 are generally similar in their noise-generating characteristics. A mobile platform is considered to be the environment in the following discussion but the principles of the invention are usable in other systems.

The diagnostic module 45 has leads 55 to a computer system 58 and leads extend from the computer system to the linear controllable power converter 49.

Bus 24 extends through a second channel similar to the first channel and includes similar circuits and modules as described above to a device bank 59 including computers or processors.

Bus 26 extends through a third channel including similar devices as in the first and second channels to a device bank 62 including, for example, sonar sensors, infrared spotlight, camera lens control and other similar devices. These devices have generally similar noise-generating characteristics.

Most of the modules in FIG. 1 are well known to those skilled in the art and need not be shown or described in detail. However, modules 49 are shown in greater detail in FIG. 2 and the diagnostic circuit or module 45 is shown in detail in FIG. 3.

Figure 2:
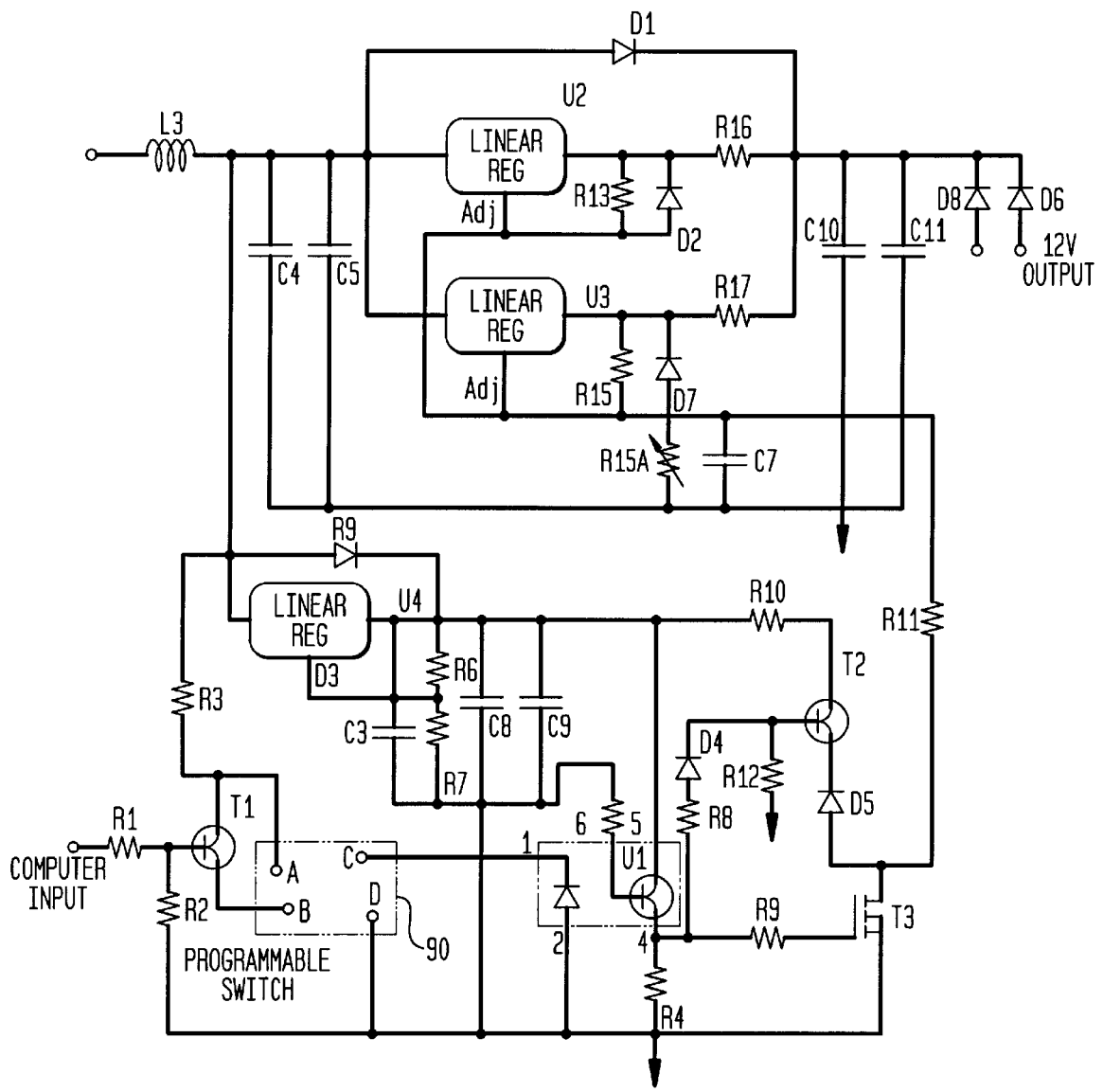
FIG. 2 is a detailed schematic circuit diagram of a portion of the system of the invention.

Reference is made to FIG. 2 for a more detailed description of the modules 49 which are known as the linear power board of the system. The power supply voltage is coupled to a filter made up of coil L3 and capacitors C4 and C5 and then to a pair of parallel linear regulators U2 and U3 and through parallel capacitors C10 and C11 to an output terminal at which a reduced voltage of about 12 volts is present.

The coil L3 is also coupled through another linear regulator U4 through cpapacitors C8 and C9 to a transistor T2 to a MOSFET transistor T3. An input from a computer in the system is coupled through a resistor R1 to transistor T1 to a multi-terminal programmable switch 90 and to bus 94. The programmable switch 90 is also coupled to an optocoupler U1 and through a resistor R9 to transistor MOSFET T3.

The computers in the system 10 are powered separately to provide a private power supply line which is not affected by accidental short circuits in other system electronics.

All power supply banks in the system 10 are controlled over a wide voltage range and are fully isolated from the controlling device. The linear regulators U2, U3 and U4 are constructed with an adjustable pin (not shown) and they can also be used as a solid state switch. Turn on and shut off control signals are applied to the solid state programmable switch 90 through an optocoupler U1 to insure that noise is not fed to the regulator through its adjustment pin.

The programmable switch is provided to increase the compatibility features and to insure that the invention can be operated by substantially any input signal at terminal 50. The programmable switch 90 is incoporated at the optocoupler contol input to select a positive level or a ground level voltage as the control signal to the optocoupler. These signals come from a computer when power is turned on. Also, a switch setting to maintain each power bank constantly on is incorporated. The control input is activated by any DC voltage higher than two volts with micro amperes of current consumption.

To increase the compatibility of the components of the invention, the output of all linear power banks is adjustable from 1.5 to 13 volts.

The linear power modules 49, in one embodiment of the invention, provide 80 decibels of noise and ripple rejection from DC to frequencies above 1 Megahertz. This is achieved by means of two types of noise and ripple reducing filters. The supply voltage is first filtered through the passive filter consisting of coil L3 and capacitors C4 and C5. This filter has a cutoff frequency of about 120 Hertz and noise filtering characteristics which improve as the frequency increases. After the input passive filter, the supply voltage is applied to the regulator/active filter made up of regulators U2 and U3, and capacitors C7, C10 and C11. This filter has a cutoff frequency of about 120 Hertz and noise filtering characteristics which improve as the frequency increases. Capacitors C4 and C5 in conjunction with floating regulator/active filter U4 and capacitors C10 and C11 provide the low frequency noise and ripple rejection to insure an overall minimum of 80 decibel from DC to frequencies above 1 Megahertz.

To enhance filtering an additional bypass capacitor C7 is provided between the built-in adjustment pin of the floating regulators U2 and U3 and the ground bus. This capacitor prevents ripple from being amplified as the output voltage of the regulators U2 and U3 is increased. This capacitor C7 provides a 10 decibel attenuation of the output noise and ripple when the bypass capacitor used is 10 microfarad.

The overall noise and ripple rejection performance is a function of the combined effort of the passive filter L3, C4 and C5 and the active filters U2, U3, C7, C10 and C11 which produce a minimum of 80 decibel attenutation in the noise figure from DC to frequencies above 1 Megahertz.

The circuit shown in FIG. 2 is capable of delivering a total current of 5 amperes when operated at its maximum capability. This is achieved by using the two regulator devices U2 and U3 joined by resistors R16 and R17 which limit current surges beyond 6 amperes.

The floating linear regulators U2 and U3 used are National Semiconductor LM350K which are capable of providing good load regulation and filtering performance for the frequency range between zero hertz and ten kilohertz. Two regulators provide good current however, one might also be used under the proper circumstances. To insure optimum performance, the programming resistor R15 is placed as close to the regulating devices U2 and U3 as physically possible to minimize any voltage drops which would introduce noise at the output. The ground connection to resistor R15 is also kept as close as possible to the ground bus to further reduce the possibility of injecting additional noise into the regulator adjustment pin.

The performance of the linear power module 49 is enhanced by the features which allow each to be used as a fast solid state switch. This is facilitated by optocoupler U1 which can be driven by a ground voltage level or a positive voltage level.

A control signal from the computer input is applied to terminal 50 and to transistor T1 and then to programmable switch 90 which allows three types of operation modes. In the ground voltage level setting, with terminal D connected to ground, the optocoupler transistor output turns on when the input at R1 reaches zero volts. The second mode allows the optocoupler transistor output to turn on when the input voltage at R1 is between 1.5 and 5.0 volts. The third mode allows the power bank to remain powered on in a constant mode of operation. The use of an optocoupling device eliminates the possibility of introducing noise into the adjustment pin of the regulator and provides a method of controlling the power banks by the system computers. It is noted that a single processor can control all of the functions described herein.

The diagnostic circuit 45 associated with each channel in the system includes a lead from the DC to DC converter module 40 to inputs of two op amps 80 and 84 connected as a differential amplifier. The outputs of the differential amplifier are coupled together to a transistor T1 the collector of which is coupled to a diagnostics computer.

Figure 3:
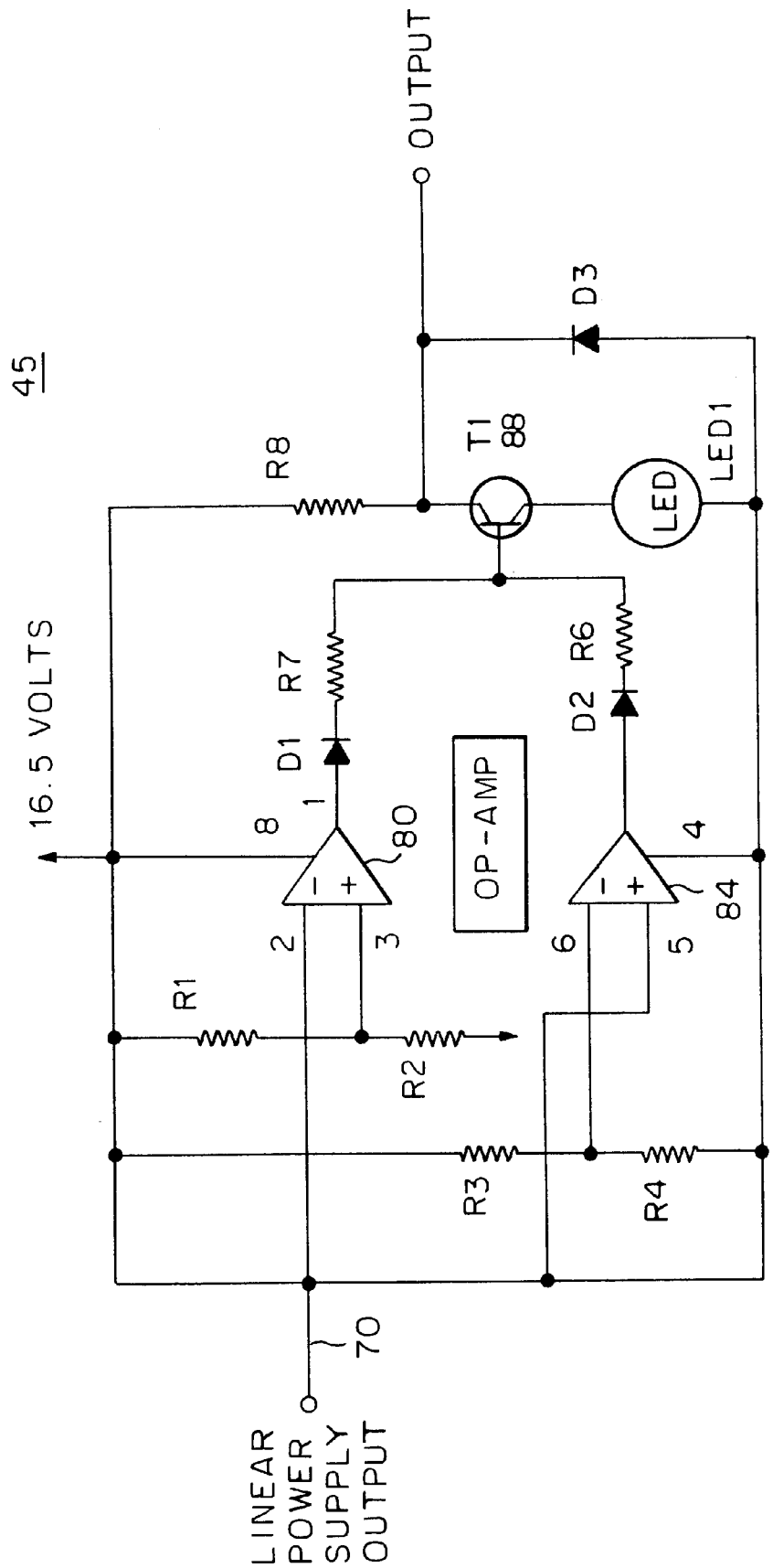
FIG. 3 is a schematic diagram of diagnostic circuitry used in the system of the invention.

The built in diagnostics circuit 45 shown in FIG. 3 provides two important functions. First it senses for a fault in each power supply bank output or in the load that it is supplying and second, it uses that information to shut off the faulty power bank. If a fault is detected by the diagnostic circuitry, a shut down signal is sent to the appropriate system computer which will shut the power bank off through the control input R1.

The diagnostic circuitry (FIG. 3) provides each of the linear power banks with the capability of detecting a faulty load or a faulty linear power board. FIG. 3 shows a window comparator (op amp) which detects two voltage levels. Each power bank is capable of monitoring voltage fluctuations below 11 volts or above 13 volts. If fluctuation occurs, the diagnostic circuit output will have a high voltage level (limited to 5 volts). When no fault occurs, the diagnostics output will have a zero value on the diagnostics output. All diagnostic output information from all power linear power boards are fed into a central diagnostics buffer and processed by a computer. The diagnostics information is then sent over a communication link to the console information center.

In operation of the system 10, the battery supply 20 couples the selected supply voltage to the LC filters 41 which filter the voltage and prevent noise from entering the associated bus. The supply voltage is coupled through the diagnostic circuit module 45 to the linear power board module 49.

The supply voltage is first filtered through a passive filter consisting of coil L3 which has a cutoff frequency of about 120 Hertz and noise filtering characteristics which improve as the frequency increases. After the passive filter, the voltage is applied to the regulator/active filter of the capacitors C4 and C5 in conjuction with the floating regulator U2 and U3 and capacitors C10 and C11. This filtering arrangement provides low frequency noise and ripple rejection to insure an overall minimum of 80 decibels from DC to frequencies above 1 Megahertz.

To enhance filtering an additional bypass capacitor C7 is provided between the adjustment pin of the floating regulator U1 and U2 and the ground bus. This capacitor provides a 10 decibel attenuation on the output noise and riple when the bypas capacitor has a value of 10 microfarads.

The overall noise and ripple rejection of the linear power board module 49 is a function of the combined effort of the passive and active filters which produce a minimum of 80 decibel attenuatiton in the noise figure from DC to frequencies over 1 megahertz.

The linear power bank can provide a total current of 5 amperes when operated to its maximum power capability. This is accomplished by using two regulator devices U2 and U3 joined by resistors R16 and R17 which limit current surges beyond 6 amperes. More or fewer linear regulators can be used where current requirements are different.

The floating linear regulator is capable of providing good load regulation and filtering for the frequency range between zero Hertz and ten kilohertz. To insure good performance the programming resistor R15 is provided as close to the regulating device as possible to minimize any voltage drops which might introduce noise at the output. The ground connection to R15 is also kept as close as ossible to the ground bus to further reduce the possibility of injecting noise into the regulator adjustment pin.

The performance of the linear power board is further enhanced by the design features which allow each power bank to be used as a fast solid state switch. The design of the control circuit which receives the command to turn the power bank on or off is unique in its perforamance and provides full compatibility with any other device. It consists of an optocoupler which can be driven by a ground voltage level or a positive voltage level as described above.

The control signal which is derived from the system central processsor is applied to transistor T1 and then to the programmable switch 90 which operates to turn on the optocoupling device U1 which eliminates the possibility of introducing noise in the adjustment pin of the regulator and provides a method to control the power banks by the onboard computers. When a control signal is applied to the input terminal 50, it operates through the programmable switch 90 to turn on the optocoupler U1 and the MOSFET T3 and then to turn on the linear regulators U2 and U3 to provide the 12 volt output voltage at the terminal and to the associated power bank of devices.

As to operation of the diagnostics circuitry shown in FIG. 3, it operates in detail as follows: The circuitry provides a window comparator which operates between two voltage levels. Each power bank is capable of monitoring voltage fluctuations below 11 volts or above 1.3 volts. If fluctuation occurs, the diagnostics output will have a high voltage level. When no fault occurs the diagnostics output will have a zero value on the diagnostics output which is fed into a central diagnostics buffer and processed by the system central processor.

What is claimed is:

1. An electrical power management system comprising a primary power source, a plurality of channels for feeding power from said primary source, each channel being coupled to a bank of electrical and electromechanical devices all of which have generally similar noise generating characteristics, further comprising a DC to DC converter in each of said channels for converting the voltage output of said primary source to a different voltage.

2. An electrical power management system comprising a primary power source, a plurality of channels for feeding power from said primary source, each channel being coupled to a bank of electrical and electromechanical devices all of which have generally similar noise generating characteristics, further comprising an input terminal at which a first supply voltage is provided, a filter means to which said input terminal is coupled, a linear regulator module having an input coupled to said filter means and having an output, an output terminal coupled to said output of said linear regulator and providing a second supply voltage, and switching means coupled to said linear regulator for coupling said first supply voltage to said output terminal.

3. The system defined in claim 2 wherein said switching means includes an input terminal at which a control signal is provided, a programmable switch, an optocoupler, a mosfet.

4. An electrical power management system comprising a primary power source, a plurality of channels for feeding power from said primary source, each channel being coupled to a bank of electrical and electromechanical devices all of which have generally similar noise generating characteristics, further comprising an inductor-capacitor filter, a DC to DC converter for modifying the voltage of said primary power source, a second filter means, a linear power board for providing a second supply voltage to be applied to a bank of electrical and electromechanical devices, a bank of electrical and electromechanical devices, a source of control signals coupled to said linear power board and a diagnostic circuit for sensing problems in said system.

* * * * *